(12) United States Patent
Huang et al.

(10) Patent No.: US 8,988,420 B2
(45) Date of Patent: Mar. 24, 2015

(54) VISUAL FILE REPRESENTATION

(75) Inventors: Jianbing Huang, Shoreview, MN (US); Michael B. Carter, Ames, IA (US); Andreas Johannsen, Ames, IA (US); Brett Harper, Ames, IA (US); Jeremy Bennett, Ames, IA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 2247 days.

(21) Appl. No.: 11/837,305

(22) Filed: Aug. 10, 2007

(65) Prior Publication Data

US 2008/0143714 A1    Jun. 19, 2008

Related U.S. Application Data

(60) Provisional application No. 60/822,133, filed on Aug. 11, 2006.

(51) Int. Cl.
| | |
|---|---|
| G06T 15/00 | (2011.01) |
| G06T 17/00 | (2006.01) |
| G06T 15/30 | (2011.01) |
| G06T 17/20 | (2006.01) |
| G06T 17/10 | (2006.01) |

(52) U.S. Cl.
CPC .......... *G06T 17/10* (2013.01); *G06T 17/20* (2013.01); *G06T 17/00* (2013.01); *G06T 15/00* (2013.01)
USPC ........................ 345/419; 345/420; 345/423

(58) Field of Classification Search
USPC ........................... 345/419, 420, 423
See application file for complete search history.

(56) References Cited

U.S. PATENT DOCUMENTS

| | | | | |
|---|---|---|---|---|
| 6,535,211 | B1 * | 3/2003 | Hariya et al. ............... 345/423 |
| 7,277,835 | B2 * | 10/2007 | Spitz et al. ............... 703/5 |
| 7,340,383 | B2 * | 3/2008 | Mayuzumi et al. ............... 703/7 |
| 2002/0109681 | A1 | 8/2002 | Elber |
| 2003/0135846 | A1 * | 7/2003 | Jayaram et al. ............... 717/137 |
| 2006/0155418 | A1 * | 7/2006 | Bradbury et al. ............... 700/182 |

OTHER PUBLICATIONS

Santa Cruz Ducci, D. Compression of 3D models with NURBS (2003) Ph.D. Thesis, Swiss Federal Institute of Technology (EPFL), pp. 77-80, 138-140.*
Ravi Kumar G V V et al: "Computing non-self-intersecting offsets of NURBS surfaces" Computer Aided Design, Elsevier Publishers BV., Barking, GB, vol. 34, No. 3, Mar. 2002, pp. 209-228, XP004322755 ISSN: 0010-4485 abstract p. 209, paragraph 1—p. 213, paragraph 2.3.3 p. 218, left-hand column, line 11—right-hand column, line 10.
Piegl L A et al: "Computing offsets of NURBS curves and surfaces" Computer Aided Design, Elsevier Publishers BV., Barking, GB, vol. 31, No. 2, Feb. 1999, pp. 147-156, XP004222870 ISSN: 0010-4485 abstract p. 147, paragraph 1—p. 152, paragraph 4.
Piegl L: "On NURBS: A Survey" IEEE Computer Graphics and Applications, IEEE Service Center, New York, NY, US, vol. 11, No. 1, Jan. 1991, pp. 55-71, XP000179582 ISSN: 0272-1716 the whole document.

* cited by examiner

*Primary Examiner* — David Zarka
*Assistant Examiner* — Robert Craddock (57) ABSTRACT

A system, method, and computer program for producing a visualization format from CAD data comprising producing a BREP model for visualization, wherein said BREP model has a topology component and a geometry component; removing a plurality of redundant control points from said geometry component; normalizing a plurality of knot vectors and a plurality of weight components from said geometry component; recognizing an analytic geometry from said geometry component; recognizing a plurality of equivalents from said geometry component; and converting said analytic geometry to said light model representation, and appropriate means and computer-readable instructions.

5 Claims, 10 Drawing Sheets

VISUAL FILE REPRESENTATION

PRIORITY OF APPLICATION

The present application claims priority of U.S. provisional application Ser. No. 60/822,133 filed Aug. 11, 2006, which is incorporated herein by reference.

CROSS-REFERENCE TO RELATED APPLICATIONS

This application is related to U.S. Ser. No. 11/837,371, entitled "METHOD AND SYSTEM FOR ORGANIZING TOPOLOGY ELEMENTS FOR BETTER COMPRESSION" and U.S. Ser. No. 11/837,402, entitled "METHOD AND SYSTEM FOR TRIMMED SURFACE TESSELLATION", both filed on even date herewith, which applications are incorporated by reference here.

TECHNICAL FIELD

The presently preferred embodiment of the innovations described herein relate generally to computer graphics software applications. More specifically, the presently preferred embodiment relates to a light-weight visualization format produced from computer aided drafting data.

BACKGROUND

Geometric representation that is capable of comprehensive functionality requirements is becoming increasingly important for engineering visualization industry as three-dimensional ("3D") data usage is being expanded to non-engineering purposes such as training, maintenance, etc. 3D representation can result in geometric files growing in size from "light weight" (also "light" or "lw") files of less than 500 kilobytes to "heavy weight" (also "heavy" or "hw") files of more than 2, 5 or 20 megabytes, for example. Light-weight 3D representation is crucial for collaborative visualization, where the visualization activity occurs in a distributed enterprise environment with the data being physically located on a different computer in the network (particularly if the visualization data must be transferred via LAN, WAN, email or any other low-bandwidth transmission medium).

Two important visualization functionalities are fast graphics display and accurate geometric analysis. Most visualization systems today use mesh representation in their file formats for maximum speed to reduce conversions from the file format to the graphics hardware, given that current graphics hardware is designed in a way such that its performance is best when the input data is represented in mesh format consisting of a collection of planar triangles. For better performance, several mesh representations of different details, usually call Level-Of-Detail or LOD, for the same part geometry may simultaneously exist in the file so that the graphics engine can choose to use less-detailed version for objects that are considered visually less significant in the scene. There are three major issues with LOD representation. First, LOD resolutions are fixed in the file format, so the curved surface may not appear smooth when zoomed-in, or magnified, thereby creating undesirable visual artifacts. Second, flat facets in mesh representation are merely linear approximations to the real object geometry. Some geometric operations, such as derivative computation, may not be meaningful at all for mesh, and other operations may not result in the desired accuracy. Third, LOD representations can be heavy even with state-of-art advanced compression. Fundamentally, flat facets, the basic element of LOD representation, does not exploit the intrinsic property of curved surface geometry.

An alternative format called Boundary Representation, or BREP, can be used for graphics display in the file format BREP contains accurate geometry description of object geometry in which the modeling primitives can be curved. BREP representation is also the industry standard for 3D representation in CAD packages where the engineering models are authored, and therefore contains necessary information for all kinds of geometric operations with required accuracy. However, BREP representation is heavy and frequently heavier than typical LOD representation. In addition, BREP surface representation in general can't be directly accepted by mainstream graphics APIs such as OpenGL and DirectX. Facet representation needs to be generated by BREP with a process commonly called tessellation, before the object can be displayed on screen. The speed of BREP tessellation is therefore critical for graphics performance. Including both LOD and BREP representations in the file would fulfill most graphics and geometry operations and requirements, but only at the cost of making the file size even bigger.

What is needed is a system, process, and method for a design representation that is light enough such that it can be easily shared in bandwidth-limited distributed network environment, and contains information that is heavy enough to support comprehensive graphics and geometric functions in engineering visualization applications.

SUMMARY

To achieve the foregoing, and in accordance with the purpose of the presently preferred embodiment as broadly described herein, the present application provides a method for producing a visualization format from CAD data, comprising producing a BREP model for visualization, wherein said BREP model has a topology component and a geometry component; removing a plurality of redundant control points from said geometry component; normalizing a plurality of knot vectors and a plurality of weight components from said geometry component; recognizing an analytic geometry from said geometry component; recognizing a plurality of equivalents from said geometry component; and converting said analytic geometry to said light model representation. The method, further comprising incorporating said topology component into said light model representation.

Another advantage of the presently preferred embodiment is to provide a system for visualization, comprising a visualization format production component that utilizes computer aided drafting (CAD) data; a visualization format compression component that writes the visualization format production component to a storage medium; and a plurality of kernels that consumes the visualization format production component from said storage medium to fulfill a plurality of engineering visualization functions.

And another advantage of the presently preferred embodiment is to provide a computer-program product tangibly embodied in a machine readable medium to perform a method for producing a visualization format from CAD data, comprising instructions operable to cause a computer to produce a BREP model for visualization, wherein said BREP model has a topology component and a geometry component; remove a plurality of redundant control points from said geometry component; normalize a plurality of knot vectors and a plurality of weight components from said geometry component; recognize an analytic geometry from said geometry component; recognize a plurality of equivalents from said geometry component; and convert said analytic geometry to said light model representation.

And still another advantage of the presently preferred embodiment is to provide a data processing system having at least a processor and accessible memory to implement a method for producing a visualization format from CAD data, comprising means for producing a BREP model for visualization, wherein said BREP model has a topology component and a geometry component; means for removing a plurality of redundant control points from said geometry component; means for normalizing a plurality of knot vectors and a plurality of weight components from said geometry component; means for recognizing an analytic geometry from said geometry component; means for recognizing a plurality of equivalents from said geometry component; and means for converting said analytic geometry to said light model representation.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 9:
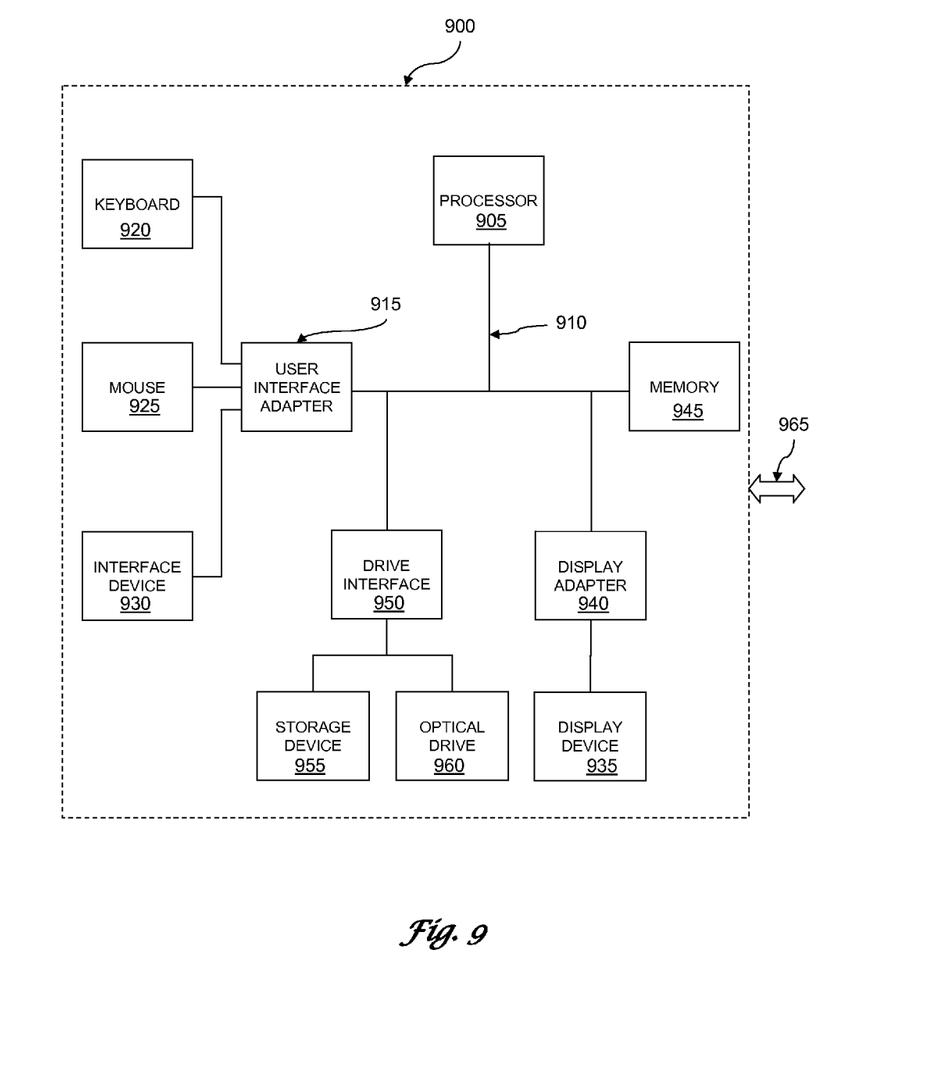
FIG. 9 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for visual file representation. Now therefore, in accordance with the presently preferred embodiment, an operating system executes on a computer, such as a general-purpose personal computer. FIG. 9 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 9, an exemplary system for implementing the presently preferred embodiment includes a general-purpose computing device in the form of a computer 900, such as a desktop or laptop computer, including a plurality of related peripheral devices (not depicted). The computer 900 includes a microprocessor 905 and a bus 910 employed to connect and enable communication between the microprocessor 905 and a plurality of components of the computer 900 in accordance with known techniques. The bus 910 may be any of several types of bus structures including a memory bus or memory controller, a peripheral bus, and a local bus using any of a variety of bus architectures. The computer 900 typically includes a user interface adapter 915, which connects the microprocessor 905 via the bus 910 to one or more interface devices, such as a keyboard 920, mouse 925, and/or other interface devices 930, which can be any user interface device, such as a touch sensitive screen, digitized pen entry pad, etc. The bus 910 also connects a display device 935, such as an LCD screen or monitor, to the microprocessor 905 via a display adapter 940. The bus 910 also connects the microprocessor 905 to a memory 945, which can include ROM, RAM, etc.

The computer 900 further includes a drive interface 950 that couples at least one storage device 955 and/or at least one optical drive 960 to the bus. The storage device 955 can include a hard disk drive, not shown, for reading and writing to a disk, a magnetic disk drive, not shown, for reading from or writing to a removable magnetic disk drive. Likewise the optical drive 960 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 900.

The computer 900 can communicate via a communications channel 965 with other computers or networks of computers. The computer 900 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 945 of the computer 900. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 1:
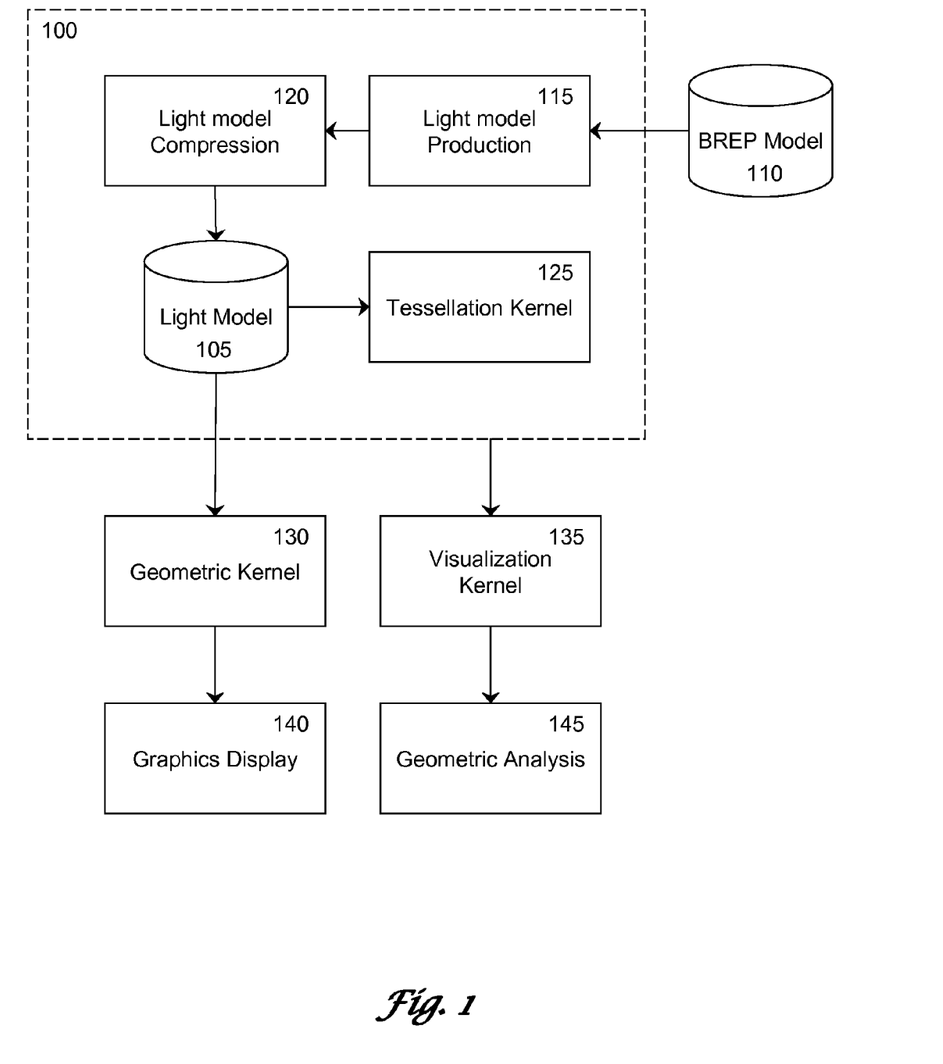
FIG. 1 is a flow diagram illustrating a visualization system.

FIG. 1 is a flow diagram illustrating a visualization system. Referring to FIG. 1, a light model visualization system, generally illustrated at 100, has a light model format stored on disk 105 produced from a BREP model 110 derived from CAD data by a light model production component 115, written to disk by a light model compression component 120, and consumed by a tessellation kernel 125, a visualization kernel 130, and a geometric kernel 135 to fulfill engineering visualization functions such as to a graphics display 140 or a geometric analysis 145.

Operation

Figure 2:
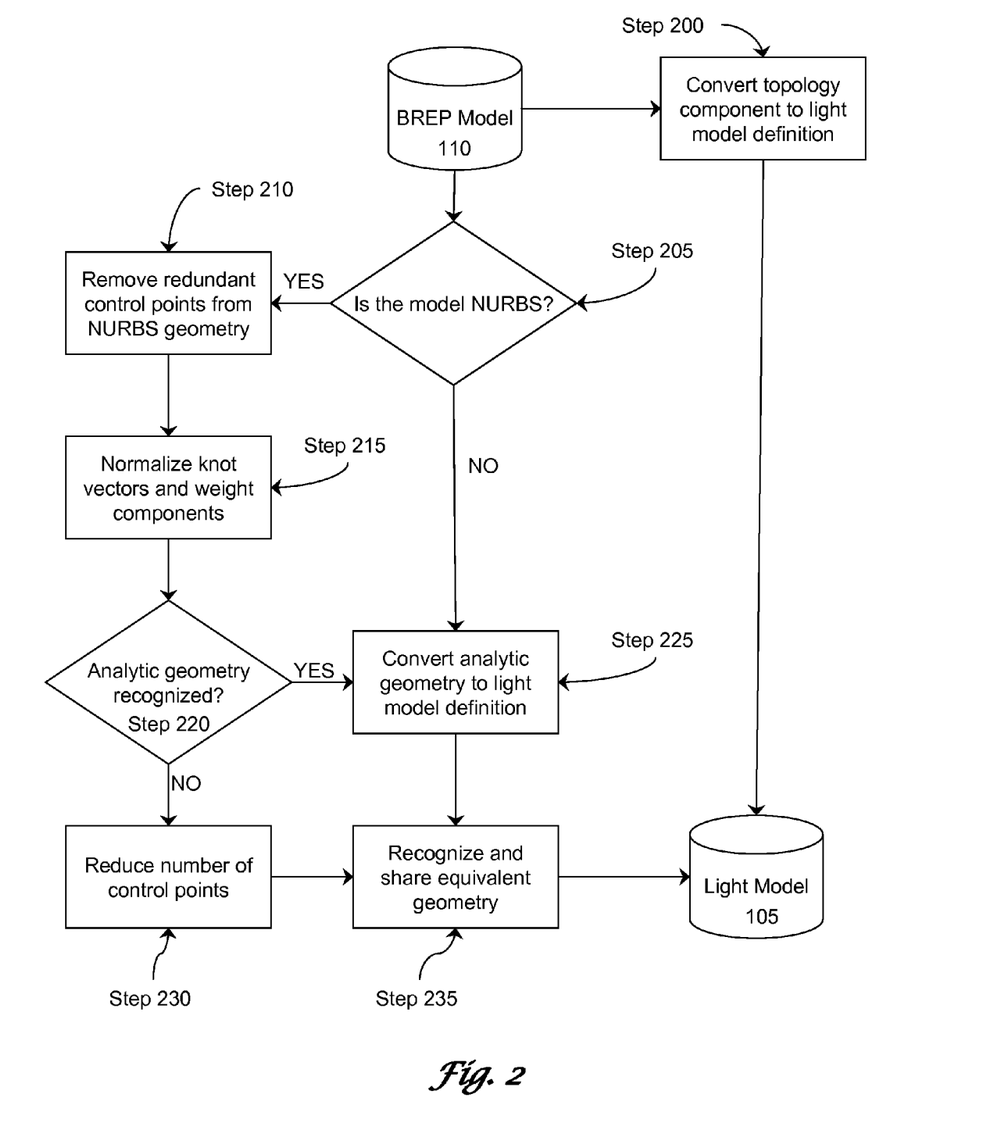
FIG. 2 is a flow chart illustrating a light model production.

FIG. 2 is a flow chart illustrating a light model production. Referring to FIG. 2, the BREP model 110, by definition, has two components, a topology component and a geometry component. To begin, the topology component is converted (Step 200) to the light model definition stored on disk 105, discussed below in more detail in the section label Topology Component. Next, the presently preferred embodiment queries the geometry component to determine whether it is in NURBS (Non-Uniform Rational B-Spline) form or in analytic form (Step 205). If the geometric component is in NURBS form then the presently preferred embodiment removes the redundant control points outside trimmed regions (Step 210), discussed below in more detail in the section labeled NURBS Geometry Approximation. Next, knot vectors and weight components are normalized to conform to the light model definition (Step 215), discussed below in more detail in the section labeled Enforcing Predictable Patterns. Determine whether the NURBS forms (or NURBS representations) are analyzed from analytic geometry (or representations) (Step 220), discussed below in more detail in the section labeled Recognize Analytic Representations. If analytic geometry is recognized, then convert the analytic geometry to the light model definition (Step 225) discussed below in more detail in the section labeled Enforcing Predictable Patterns. Returning to Step 205, if the geometry component is already in analytic form, then convert the analytic geometry to the light model definition (Step 225), as discussed below in the section labeled Enforcing Predictable Patterns. Continuing, if analytic geometry is not recognized, then attempt to reduce the number of control points (Step 230), as discussed below in the section labeled NURBS Geometry Approximation. Finally following either Step 225 or Step 230, attempt to recognize and share equivalent geometric elements (Step 235), discussed below in more detail in the section labeled Recognizing Equivalent Geometric Elements, to the light model definition stored on disk 105.

Topology Component

Figure 3:
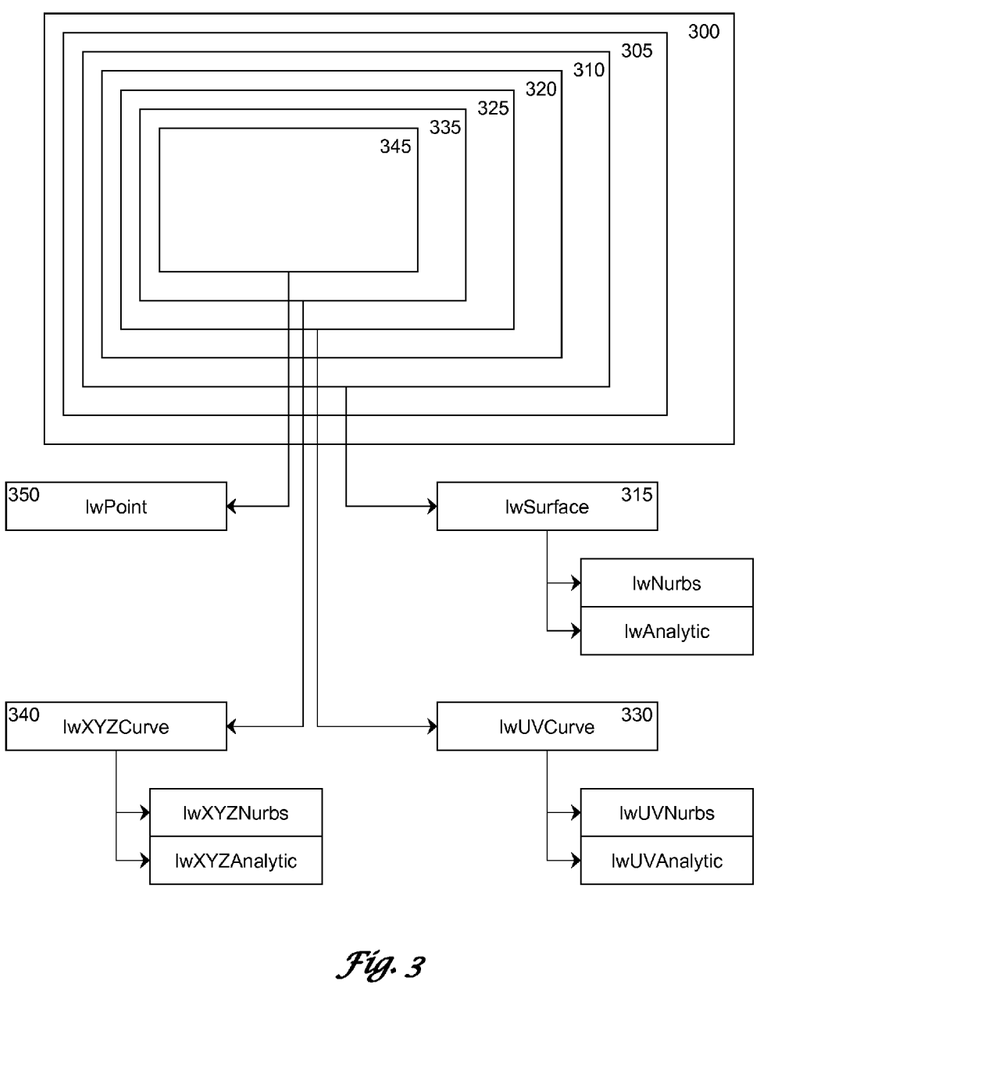
FIG. 3 is an illustration of a light model definition.

FIG. 3 is an illustration of a light model definition. Referring to FIG. 3, from a topological perspective, the light model definition 105 has a region 300 that contains one or more shells 305 each of which corresponds to an isolated three-dimensional (3D) object with manifold topology. Each shell 300 consists of a collection of faces 310 covering the manifold geometry. Each face 310 is associated with a surface 315 that describes its geometry in the 3D Euclidean space. The surface 315 representation is parametric, meaning that its geometry is the result of mapping from a rectangular box in 2D parametric space to 3D model space through a mapping function. The face geometry can be a trimmed portion of the surface geometry, and such trimming if it exists is represented by one anti-hole loop and zero or more hole loops in the parameter space, where the anti-hole loop contains all the hole loops, generally illustrated at 320. Each loop 320 consists of one or more coedges 325, and each coedge 325 has its geometry in the parametric space as a parametric space curve 330. The adjacency information between different faces is established between pairs of coedges. Assuming manifold geometry, each pair of coedges corresponds to a single edge 335 with geometry in the model space as a model space curve 340. The location where multiple edges 335 join is called a vertex 345 with geometry in the model space as a point 350. The geometric description of light model surfaces and curves is in parametric form, mapping from NURBS basis functions together with a set of control points to the parameterized description of analytic geometry. Example analytic geometric forms are plane, cylinder, cone, sphere, and torus. Example analytic geometric forms in the parametric space curve 330 are UVline and UVcircle. Example analytic geometric forms in the model space curve 340 are XYZline and XYZcircle.

NURBS Geometry Approximation

Figure 4:
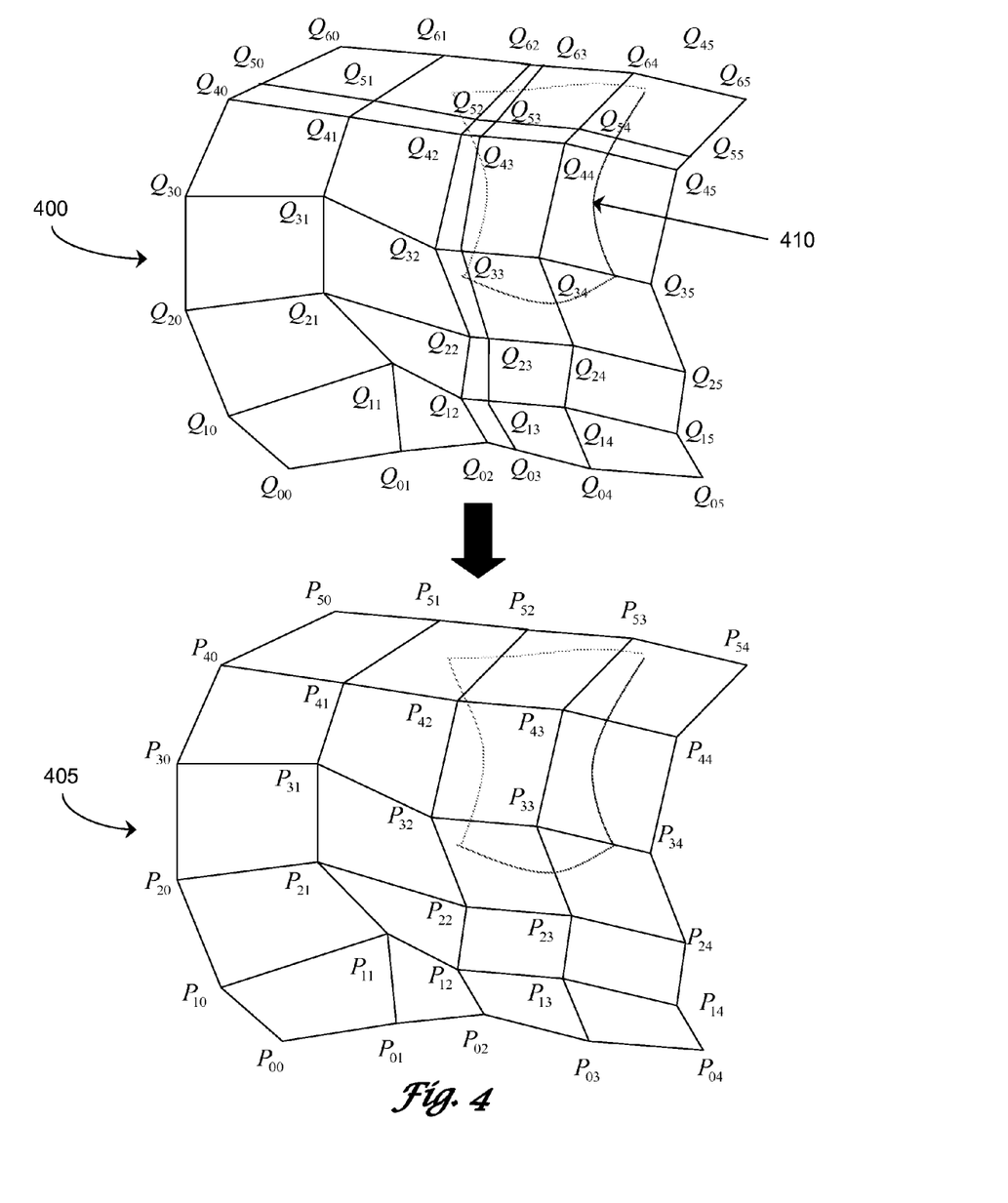
FIG. 4 is a NURBS representation with $Q_n$ control points simplified to $P_n$ control points.
Figure 5A:
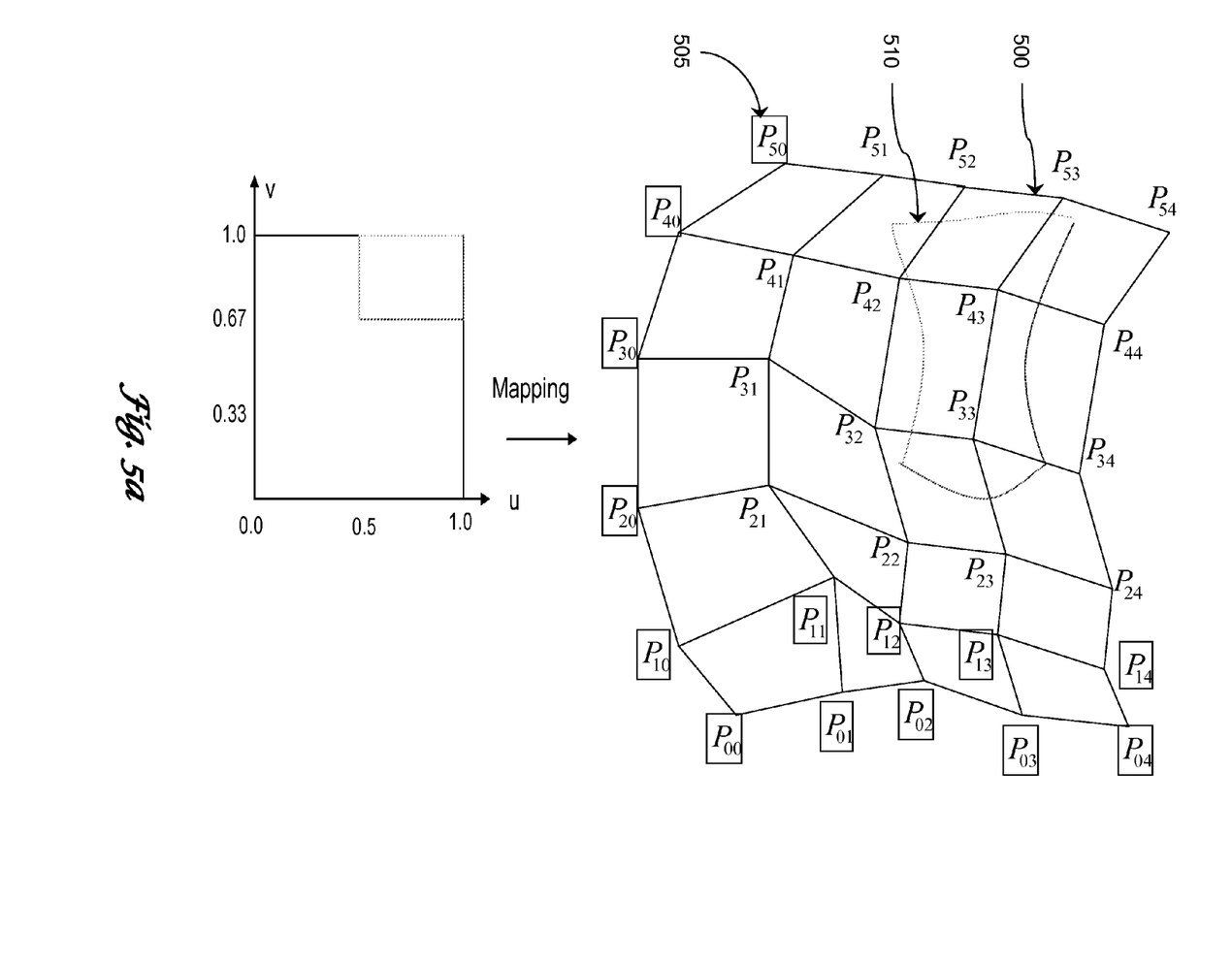
FIGS. 5a & 5b is an illustration of control points outside a trimmed region.
Figure 5B:
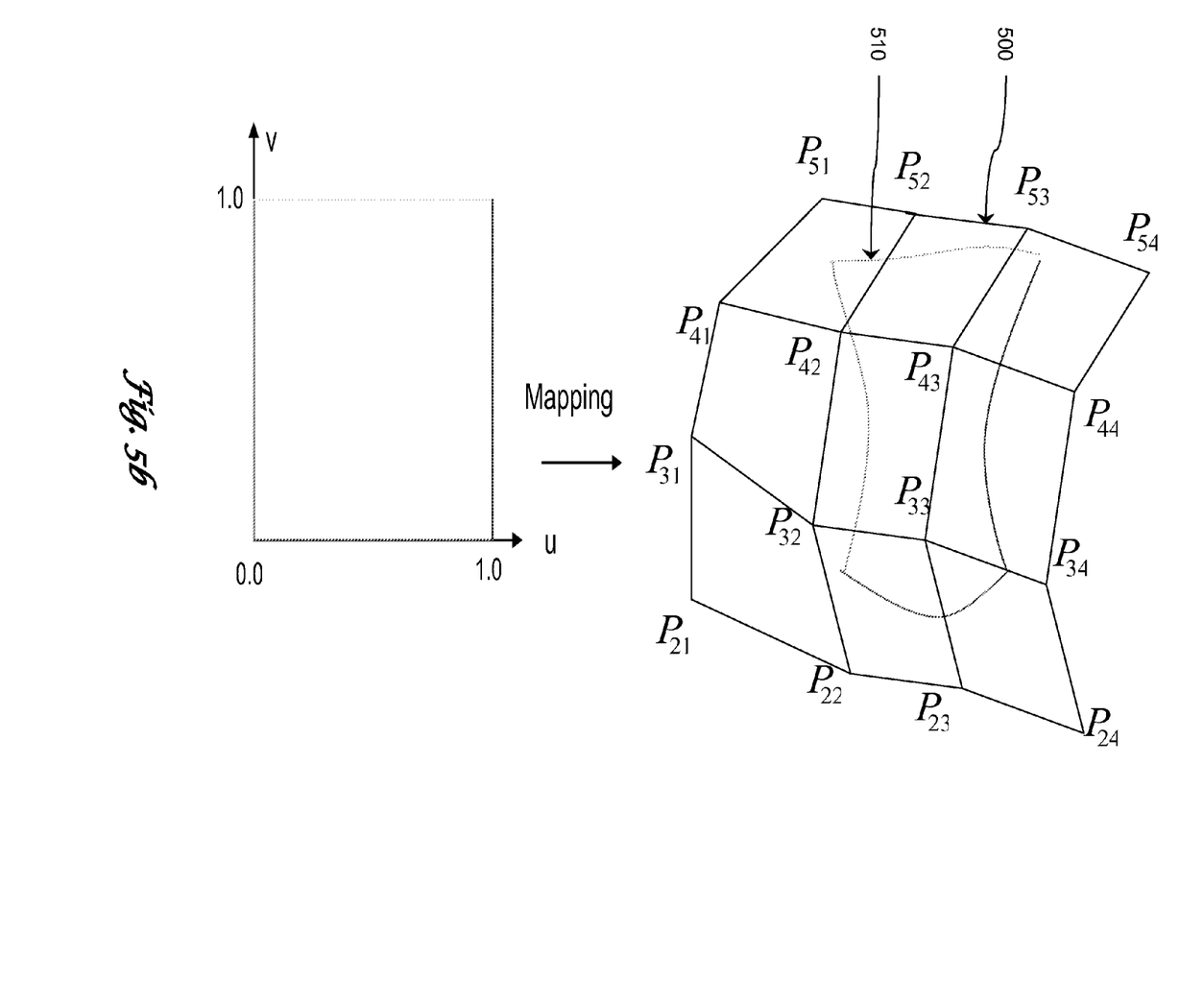

NURBS geometry may not always be efficient in the sense that too many control points may have been used, and as a result some control points contribute very little information. FIG. 4 is a NURBS representation with $Q_n$ control points simplified to $P_n$ control points. Referring to FIG. 4, for example, NURBS representation can be simplified from a first surface 400 having the control points identified as $Q_n$ to a second surface 405 having the control points of $P_n$ for the same surface provided that such simplification introduces very little accuracy loss utilizing known methods in the art. Efficient NURBS surface representation in the presently preferred embodiment has rows and/or columns of control points that lie outside of a trimmed region 410 that are to be removed from the surface definition FIGS. 5a & 5b is an illustration of control points outside a trimmed region. Referring to FIGS. 5a & 5b, an example NURBS surface of degree 3 along both u and v parametric direction. FIG. 5a illustrates an example CAD trimmed NURBS surface 500 with a knot vector mapped to the NURBS surface 500 and a number of irrelevant control points 505 (marked with boxes) outside of a trimmed region 510. FIG. 5b shows the corresponding light model surface according to the presently preferred embodiment with its knot vectors normalize to [0.0 1.0] and irrelevant control points 505 removed. The light model representation is more compact in both parametric and model space, but still represents the same geometry.

Enforcing Predictable Patterns

Geometric surface representation is by its nature versatile and mathematically superfluous. In other words, mathematical description is not unique for a particular geometry even when the type of the representation is fixed. Different descriptions can be mathematically equivalent and one description can be converted to another description without data loss. For example, the mathematical definition for a NURBS curve with degree k is shown in Eq. (1) and Eq. (2)

$$C(u) = \sum_{i=0}^{n} P_i * \frac{w_i * N_i^k(u)}{\sum_{r=0}^{n} w_r * N_r^k(u)} \quad (1)$$

where basis functions $N_i^k(u)$, $0<=i<=n$ along u direction is defined recursively as $$N_i^k(u) = \frac{u - t_i}{t_{i+k} - t_i} * N_i^{k-1}(u) + \frac{t_{i+k+1} - u}{t_{i+k+1} - t_{i+1}} * N_{i+1}^{k-1}(u) \quad (2)$$

$$N_i^0(u) = 1 \text{ if } t_i <= u <= t_{i+1} \text{ or } 0 \text{ otherwise}$$

where $U=[t_0\ t_1\ \ldots\ t_n]$ is the knot vector.

The following two key observations can be made:

a. Applying a scaling operation to the weights $w'_{ij} = \lambda * w_{ij}$, $0<=i<=n$, $0<=j<=m$ does not change Eq. (1);

b. Applying a linear operation to the knot vector $U'=a*U+b$ does not change Eq. (2); and c. It is always possible to insert additional knots to formulate the knot vector in clamped form U=[$t_0 \ldots t_0 \, t_1 \ldots t_n \ldots t_n$] where $t_0$ and $t_n$ is repeated k times.

Similar observations can also be made for NURBS surface representation. Based on these mathematical observations, eliminate the redundancy by enforcing the following two rules in the light model representation:

a. Knot vector U is preferably normalized to the range between 0.0 and 1.0 and preferably in clamped form. Take a NURBS curve with degree 3 for example, its knot vector must bear the form, so the start and end knot value and pattern are implied:

[0.0 0.0 0.0 0.0 $k_0 \ldots k_n$ 1.0 1.0 1.0 1.0], 0.0<=$k_i$<=1.0, 0<=i<=n, & b. For rational NURBS surfaces and curves, the weight component is normalized such that its maximum magnitude in the presently preferred embodiment is 1.0.

For analytic entities, the light model representation stores both the analytic surface definition and its trimmed range in the parameter space. Take a parametric representation for a trimmed planar surface in Eq. (3) for example:

$$S(u,v)=P+u*x+v*y, a<=u<=b, c<=v<=d \quad (3)$$

The same trimmed planar surface can be represented as $$S(u,v)=P'+u*x+v*y, 0<=u<=b-a, 0<=v<=d-c, P'=P+a*x+b*y$$

In other words, by repositioning the surface position at parametric location u=0, v=0 from P to P', it is possible to always force the lower parameter to 0.0 for a planar surface, thus making it predictable. Similar observations can be made to other analytic types. Based on these mathematical observations, the redundancy may be eliminated by enforcing the following rules in the light model representation: (1) The parametric domain of planar, cylindrical, and conical types preferably start from 0.0 for both of its parametric directions; (2) The parametric domain of surfaces of spherical and torus types preferably starts from 0.0 for its parametric u direction; and (3) The parametric domain of lines, both in parametric space where it is 2-Dimensional and in model space where it is 3-Dimensional, preferably starts from 0.0.

Recognize Analytic Representations

Figure 6:
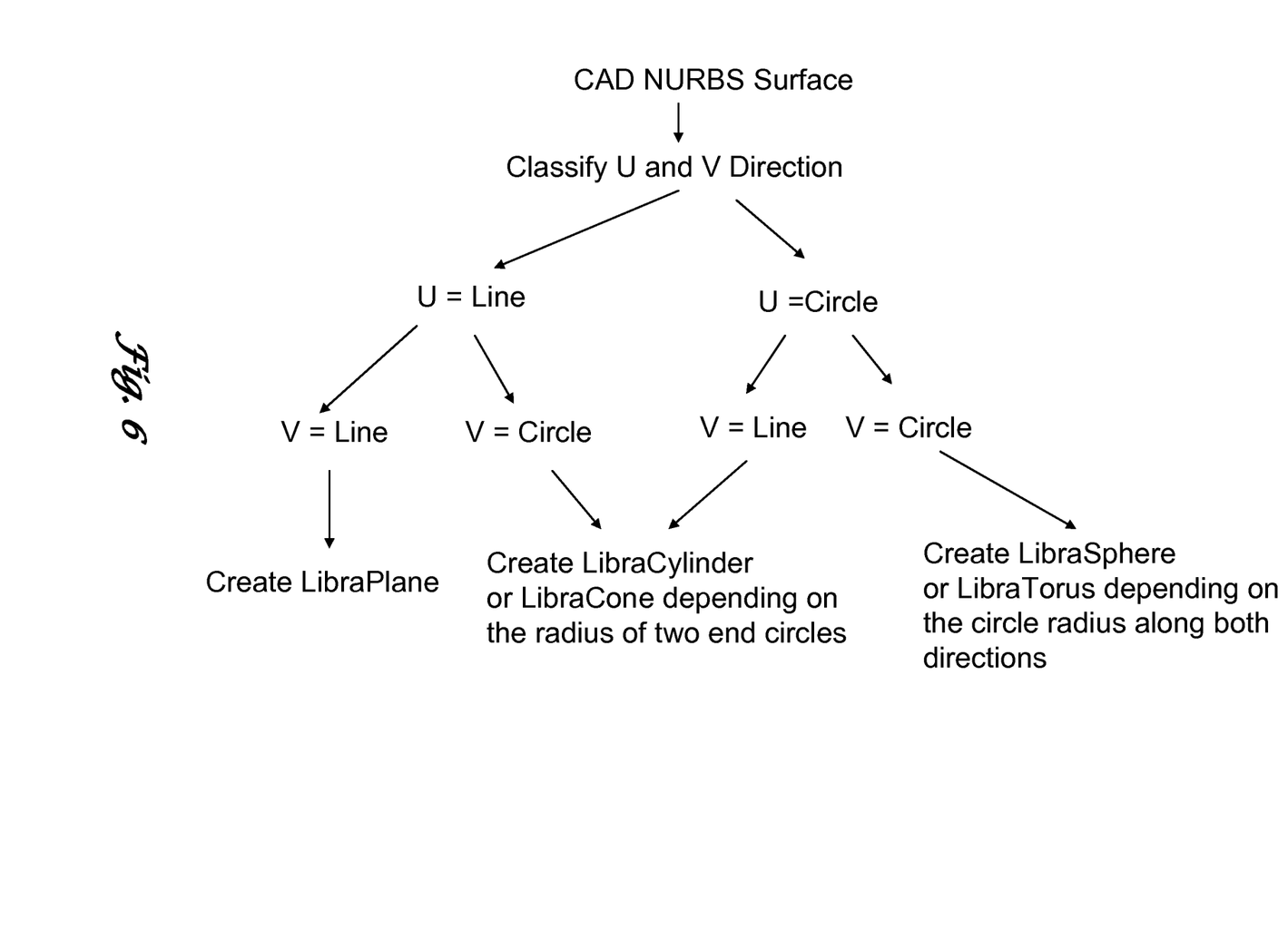
FIG. 6 is a flow diagram illustrating recognizing analytic geometry.

FIG. 6 is a flow diagram illustrating recognizing analytic geometry. Given that analytic representations are more compact, NURBS surfaces are converted to appropriate analytic representation if such conversion introduces very little accuracy loss, for example no more than 0.001% or some other such number that falls within a preferred set of requirements. Referring to FIG. 6, the 2-dimensional surface recognition problem is simplified to be two 1-dimension curve recognition problems. Such simplification results in much more efficient and robust analytic recognition from NURBS representation.

Recognizing Equivalent Geometric Elements

Figure 7:
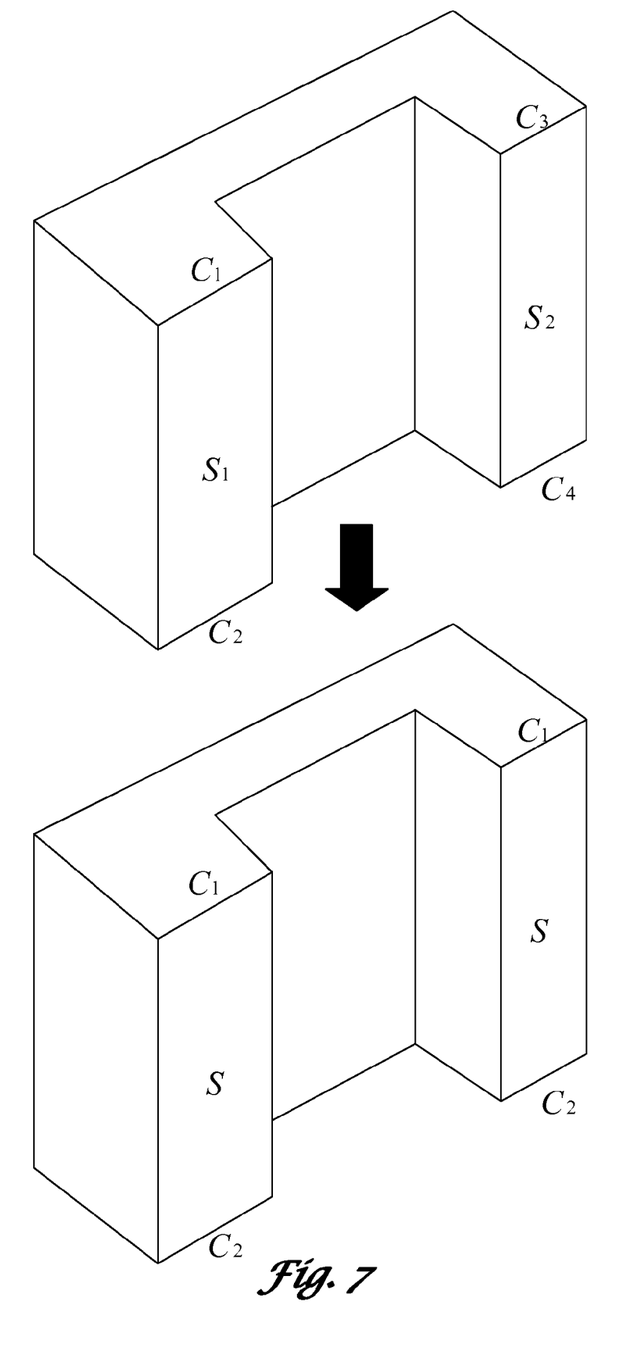
FIG. 7 is an illustration of surface and curve geometry sharing.

FIG. 7 is an illustration of surface and curve geometry sharing. Frequently multiple faces or edges can share the same surface and curve geometry. Referring to FIG. 7, where surface $S_1$ and surface $S_2$ share the same planar geometry and curve $C_1$ and $C_2$, $C_3$ and $C_4$ share the same line geometry. Although plane/line geometry is being illustrated here, similar principles apply to other geometric types. Also two geometric elements do not have to be identical in order for them to be shared. Since lossy compression is applied to the light model representation, two surfaces can share geometry if they can be considered equivalent with respect to the requested accuracy.

The information between different geometric elements in the light model structure may be related to each other. For example, the parameter range of a trimmed surface describes the bounding box of the parameter space trimming curve and the model space trimming curve may be evaluated from the corresponding parameter space curve and the surface information. Frequently, it is possible to use one source of information and then infer the other, which enables reduction of information that has to be explicitly represented.

Figure 8:
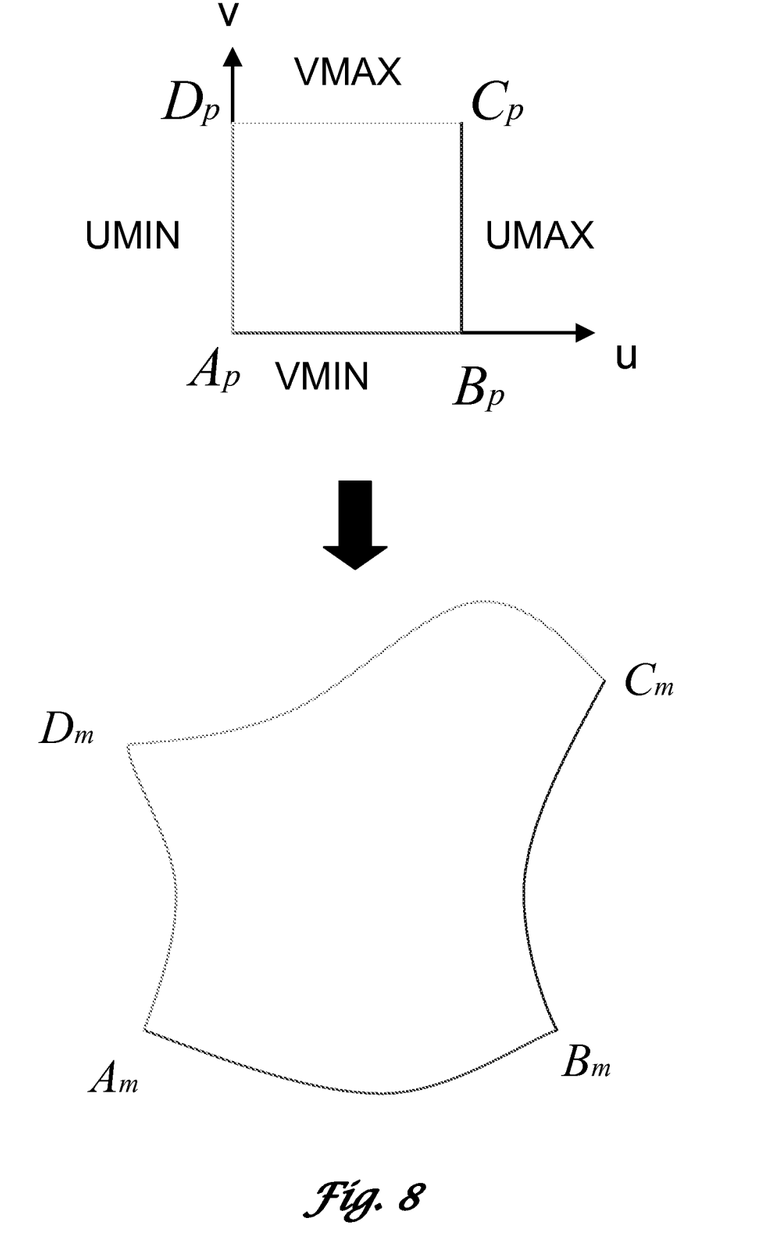
FIG. 8 is an illustration of a parametric representation for a trimmed surface.

FIG. 8 is an illustration of a parametric representation for a trimmed surface. Referring to FIG. 8, the parameter domain consists of four parameter space curves with line geometry, classified as:

UMIN: parameter space curve is minimum u line of the surface

UMAX: parameter space curve is maximum u line of the surface

VMIN: parameter space curve is minimum v line of the surface

VMAX: parameter space curve is maximum v line of the surface

The geometry of all the four uv curves can be inferred by the parameter range information of the trimmed surface. Therefore, if enough information is encoded to indicate the four possibilities UMIN, UMAX, VMIN, or VMAX for such uv curves and the uv curve, then the geometry does not need be explicitly represented.

On the other hand, the model space curve can be easily and efficiently inferred from the surface geometry if the corresponding parameter space curve is one of four types UMIN/UMAX/VMIN/VMAX. If the surface geometry is of planar type, then all its model space curves can be inferred from its parameter space curves in a straightforward way. For the example shown in FIG. 8, no curve geometry needs be explicitly represented because parameter space curves can be inferred from parameter range, and model space curves can be inferred from parameter space curves.

Conclusion

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment. Therefore, other implementations are within the scope of the following claims.

What is claimed is:

1. A method for producing a visualization format from CAD data, comprising:
producing a BREP model for visualization, wherein said BREP model has a topology component and a geometry component;
removing a plurality of redundant control points from said geometry component;
normalizing a plurality of knot vectors and a plurality of weight components from said geometry component;
recognizing an analytic geometry from said geometry component by simplifying a 2-dimensional surface recognition problem of the geometry component to two 1-dimension curve recognition problems;
recognizing a plurality of equivalent geometric elements from said geometry component that share surface and curve geometry; and
converting said analytic geometry to a light model representation, wherein the method is performed by a computer having at least a processor and memory.

2. The method of claim 1, further comprising incorporating said topology component into said light model representation.

3. A computer, comprising:
a processor;
a tangible storage medium;
a visualization format production component that utilizes computer aided drafting (CAD) data when executed by the processor;
a visualization format compression component that writes the visualization format production component to the storage medium when executed by the processor; and
a plurality of kernels, including at least a tessellation kernel, a visualization kernel, and a geometric kernel, that consume the visualization format production component from said storage medium to fulfill a plurality of engineering visualization functions when executed by the processor.

4. A non-transitory machine readable medium encoded with computer-readable instructions that, when executed, cause a computer to:
produce a BREP model for visualization, wherein said BREP model has a topology component and a geometry component;
remove a plurality of redundant control points from said geometry component;
normalize a plurality of knot vectors and a plurality of weight components from said geometry component;
recognize an analytic geometry from said geometry component by simplifying a 2-dimensional surface recognition problem of the geometry component to two 1-dimension curve recognition problems;
recognize a plurality of equivalent geometric elements from said geometry component that share surface and curve geometry; and
convert said analytic geometry to a light model representation.

5. A data processing system comprising;
a processor; and
an accessible memory storing executable instructions that together implement a method for producing a visualization format from CAD data by causing the processer to perform the steps of
producing a BREP model for visualization, wherein said BREP model has a topology component and a geometry component;
removing a plurality of redundant control points from said geometry component by simplifying a 2-dimensional surface recognition problem of the geometry component to two 1-dimension curve recognition problems;
normalizing a plurality of knot vectors and a plurality of weight components from said geometry component;
recognizing an analytic geometry from said geometry component;
recognizing a plurality of equivalent geometric elements from said geometry component that share surface and curve geometry; and
converting said analytic geometry to a light model representation.

* * * * *